US012751885B2

(12) United States Patent
Park

(10) Patent No.: US 12,751,885 B2
(45) Date of Patent: Oct. 6, 2026

(54) FUNCTIONAL CHAIR FOR POSTURE CORRECTION AND LUMBAR TRACTION

(71) Applicant: So Young Park, Incheon (KR)

(72) Inventor: So Young Park, Incheon (KR)

( * ) Notice: Subject to any disclaimer, the term of this patent is extended or adjusted under 35 U.S.C. 154(b) by 169 days.

(21) Appl. No.: 18/849,712

(22) PCT Filed: Mar. 23, 2023

(86) PCT No.: PCT/KR2023/003771
§ 371 (c)(1),
(2) Date: Sep. 23, 2024

(87) PCT Pub. No.: WO2023/182797
PCT Pub. Date: Sep. 28, 2023

(65) Prior Publication Data

US 2025/0205101 A1 Jun. 26, 2025

(30) Foreign Application Priority Data

Mar. 23, 2022 (KR) ........................ 10-2022-0036323
Apr. 5, 2022 (KR) ........................ 10-2022-0042315

(51) Int. Cl.
*A61H 1/02* (2006.01)
*A47C 1/024* (2006.01)
(Continued)

(52) U.S. Cl.
CPC ........... *A61H 1/0222* (2013.01); *A47C 7/462* (2013.01); *A47C 7/541* (2018.08); *A47C 1/0242* (2013.01); *A61H 2201/0149* (2013.01); *A61H 2201/0192* (2013.01); *A61H 2201/1207* (2013.01); *A61H 2201/1607* (2013.01);
(Continued)

(58) Field of Classification Search
CPC .. A61H 1/0218; A61H 1/0222; A61H 1/0229; A61H 1/0259; A61H 1/0292; A61H 1/0296; A61H 2201/0149; A61H 2201/1619; A61H 2201/1621; A61H 2201/1623; A61H 2201/1626; A61H 2201/1628; A61H 2201/163;
(Continued)

(56) References Cited

U.S. PATENT DOCUMENTS 4,688,557 A * 8/1987 Bradstreet ............ A61H 1/0218
606/241
6,626,494 B2 * 9/2003 Yoo ...................... A47C 31/126
297/391

(Continued)

*Primary Examiner* — Kari K Rodriquez
(74) *Attorney, Agent, or Firm* — IPLA P.A.

(57) ABSTRACT

A functional chair for posture correction and lumbar traction, includes a seat plate having legs connected to a lower portion thereof, wherein the seat plate supports buttocks of a user when the user sits on the chair, a backrest plate support rotatably provided at a rear end of the seat plate, a backrest plate disposed in front of the backrest plate support and formed to have a curved surface corresponding to shoulder and spine lines of the user, wherein the backrest plate is configured to be rotatable around a horizontal axis thereof, thereby enabling the user to maintain a state of sitting or lying down on the chair, and wherein the backrest plate has a headrest provided at an upper end thereof, and a traction driving device configured to enable the backrest plate to be moved in a movement direction of the backrest plate support.

6 Claims, 8 Drawing Sheets

(51) Int. Cl.
*A47C 7/46* (2006.01)
*A47C 7/54* (2006.01)

(52) U.S. Cl.
CPC ................ *A61H 2201/1614* (2013.01); *A61H 2201/1623* (2013.01); *A61H 2201/164* (2013.01); *A61H 2201/1652* (2013.01); *A61H 2203/0431* (2013.01); *A61H 2203/045* (2013.01)

(58) Field of Classification Search
CPC .. A61H 2201/1645; A47C 7/40; A47C 7/402; A47C 7/46; A47C 7/48
See application file for complete search history.

(56) References Cited

U.S. PATENT DOCUMENTS

| | | | | |
|---|---|---|---|---|
| 7,097,628 | B1 * | 8/2006 | Baune | A61H 1/0218<br>297/483 |
| 2006/0224097 | A1 * | 10/2006 | Bass | A61H 1/0296<br>602/32 |
| 2012/0298113 | A1 * | 11/2012 | Hruska | A61H 1/001<br>128/845 |
| 2023/0172357 | A1 * | 6/2023 | Kim | A47C 3/20<br>601/98 |
| 2024/0342038 | A1 * | 10/2024 | Parvizi | A61H 1/0222 |

* cited by examiner (a)

(b)

FUNCTIONAL CHAIR FOR POSTURE CORRECTION AND LUMBAR TRACTION

BACKGROUND OF THE INVENTION

Field of the Invention

The present invention relates to a functional chair for posture correction and lumbar traction, and more particularly, to a functional chair for posture correction and lumbar traction, configured to correct improper postures of neck and lumbar portions of a user sitting on the chair and applied to various chairs such as an office chair, an automobile chair, an airplane chair, and a medical functional chair.

Description of the Related Art

Information and communication technology has been remarkably developed since the fourth industrial revolution. Accordingly, adolescents and modern people are exposed to various information and communication media such as computers and smartphones on a daily basis at school or work. Many people spend most of their time sitting in a chair in an improper posture or living in an unhealthy posture, which causes health diseases such as spinal deformation and body imbalance. As a result, people may suffer from various health issues such as chronic muscle tension, neck pain, back pain, and shoulder pain.

Specifically, due to such an improper posture, our body suffers from diseases such as tension and pain in the neck and shoulder muscles, headache, chronic fatigue, a herniated cervical disc, scoliosis, frozen shoulder pain, chronic fatigue, and digestive disorders. Particularly, the imbalance of gravity (body weight) due to an improper posture such as bending the head forwards or bending the back causes an abnormal curve of the spine (spinal vertebrae), that is, a spinal deformity in which the spine curves to the left or light. As a result, an abnormality occurs in each of the vertebrae, and the vertebrae deviate from the respective positions thereof, causing spinal disorder and a blood circulation problem in the body.

According to a study by a scholar named Nachemson, if pressure on the intervertebral discs of the spine affected by gravity is measured as 100 in the upright standing position of the body, the pressure is measured as 25, which is the lowest pressure, in the lying down position of the body, and the pressure is measured as 140 when a person sits on a chair without a backrest. Further, the pressure is measured as 180 when a person sits on a chair while bending forwards by 20 degrees, and the pressure is measured as 150 when a person stands while bending forwards by 20 degrees. As a result, these two postures almost double the pressure applied on the intervertebral discs of the spine compared to other postures.

In particular, adolescents spend a lot of times sitting at their desks, resulting in decrease in physical activity, lack of exercise, deterioration in physical strength, an improper posture, and body imbalance. The above-described problems may lead to lower back pain and scoliosis. In addition, adolescents may feel dissatisfied with their appearance during a physically and mentally sensitive transitional period. Accordingly, adolescents may lose their self-identity, and their mental health may deteriorate.

In order to solve the above-described problems, a technique related to a functional chair is proposed in Korean Utility Model Publication No. 2021-0001659.

However, since the technique proposed in Patent Document 1 is limited to pelvic correction, there is a problem in that a function or an effect is limited in correcting an improper posture and treating a spinal deformity.

(Patent Document 1) Korean Utility Model No. 2021-0001659 (filed on Jul. 19, 2021)

SUMMARY OF THE INVENTION

Therefore, the present invention has been made in view of the above problems, and it is an object of the present invention to provide a functional chair for posture correction and lumbar traction, configured not only to correct an improper posture of adolescents so as to prevent spinal diseases such as scoliosis, kyphosis, and lordosis, but also to enable a patient having a spinal disease and a person having no spinal disease to maintain their healthy life while sitting in the chair for long hours.

In accordance with the present invention, the above and other objects can be accomplished by the provision of a functional chair for posture correction and lumbar traction, the functional chair including a seat plate having legs connected to a lower portion thereof, wherein the seat plate supports the buttocks of a user when the user sits on the functional chair, a backrest plate support rotatably provided at a rear end of the seat plate, a backrest plate disposed in front of the backrest plate support and formed to have a curved surface, wherein the backrest plate is configured to be rotatable around a horizontal axis thereof, thereby enabling the user to maintain a state of sitting or lying down on the functional chair, and wherein the backrest plate has a headrest provided at an upper end thereof, and a traction driving device configured to enable the backrest plate to be moved in a movement direction of the backrest plate support.

The headrest may be rotatable upwards and downward and may have a headband detachably provided on opposite sides thereof.

The backrest plate may be formed to have a concave shape or a convex shape on a side surface thereof, and wherein the backrest plate may include a tightening band configured to primarily pass through upper opposite sides of the backrest plate so as to be supported on shoulders of the user in a bent state and to secondarily pass through lower opposite sides of the backrest plate in a crossed state, wherein opposite ends of the tightening band passing through the lower opposite sides are connected to each other so as to wrap a waist of the user, shoulder racks disposed adjacent to the tightening band and respectively located on opposite sides of backrest plate, wherein the shoulder racks are respectively rotatably provided in grooves respectively formed in the opposite sides of the backrest plate, and wherein the shoulder racks are bolt-fastened to the backrest plate or are coupled to one of a plurality of holes formed in the backrest plate so as to be respectively located at both armpits of the user, and waist tightening bands provided on opposite lower sides of the shoulder racks, wherein the waist tightening bands are provided above and below each other.

The traction driving device may include a driving part detachably provided on one of armrests respectively provided on opposite sides of the seat plate, wherein the driving part is manually operated leftwards and rightwards so as to move the backrest plate upwards and downwards or automatically provides driving force by an automatic motor and an operating switch, a driving shaft rotatably supported by upper and lower portions of a back surface of the backrest plate support, wherein the driving shaft has a connection joint spirally coupled thereto and configured to move the backrest plate upwards and downwards according to a rotation direction of the driving shaft, and a flexible shaft configured to connect the driving part to the driving shaft.

The seat plate may include a plurality of lower body bands configured to support the buttocks and legs of the user.

The backrest plate may be rotated to perform, when the user lies down on the functional chair, the lumbar traction of the user by the traction driving device, the backrest plate support may have a safety support unfolded from a rear surface thereof and supported on the ground, and a tension measurement sensor may be attached between the seat plate and the backrest plate so as to gradually control tension therebetween.

The seat plate may include a fixed seat plate and a cushion seat plate slidably movable on an upper side of the fixed seat plate.

A tension belt may be connected to a rear end of the cushion seat plate and a lower end of the backrest plate adjacent to the cushion seat plate, thereby enabling the cushion seat plate to be moved in conjunction with movement of the backrest plate.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE INVENTION

Figure 1:
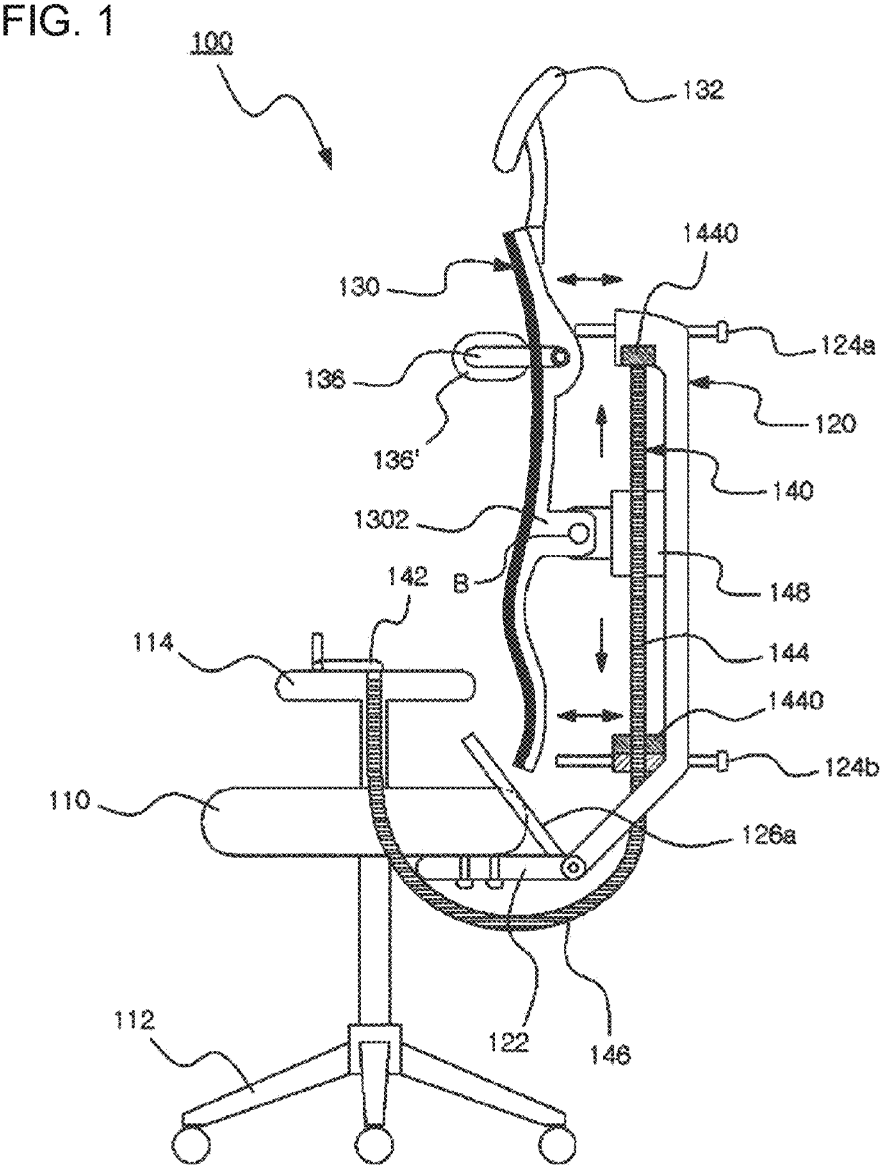
FIG. 1 is a side view showing a functional chair for posture correction and lumbar traction according to the present invention.
Figure 2:
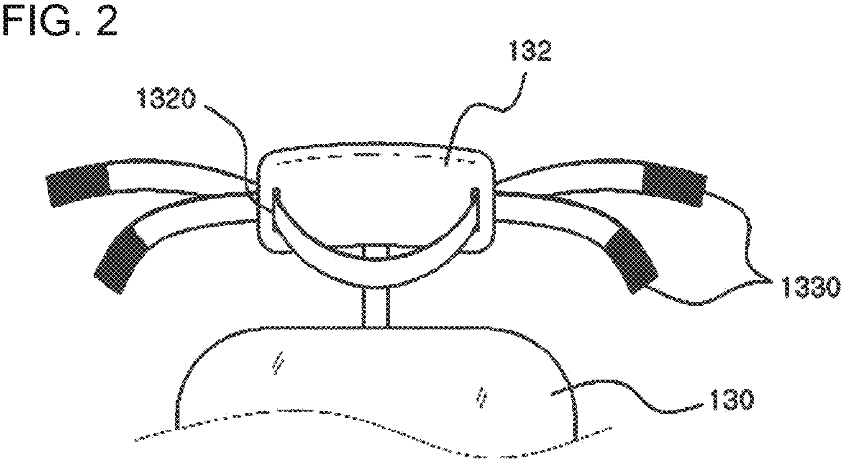
FIG. 2 is a front view and a use state view each showing a headrest in the functional chair for posture correction and lumbar traction according to the present invention.
Figure 2:
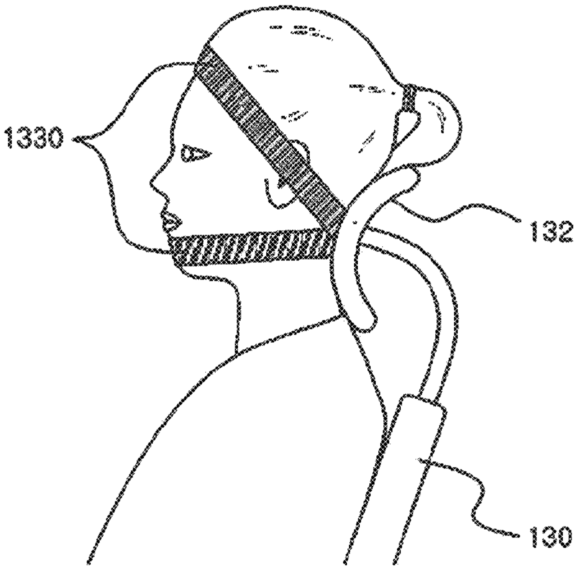
Figure 3:
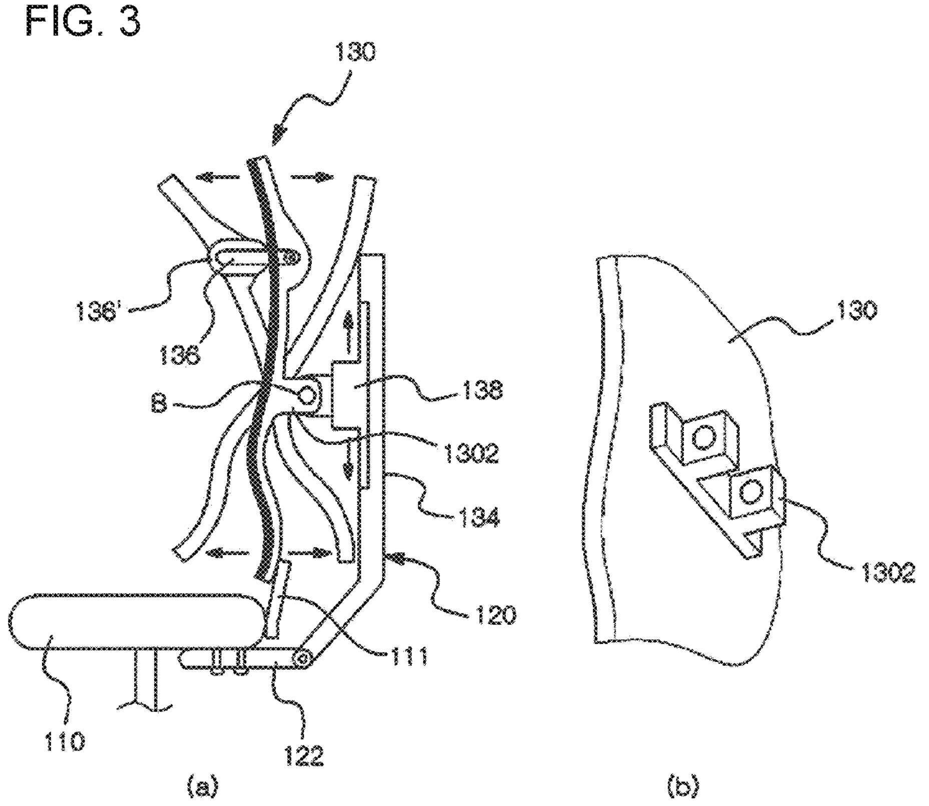
FIG. 3 is a side view showing a state in which a backrest plate is rotated on a backrest plate support in the functional chair for posture correction and lumbar traction according to the present invention.
Figure 4:
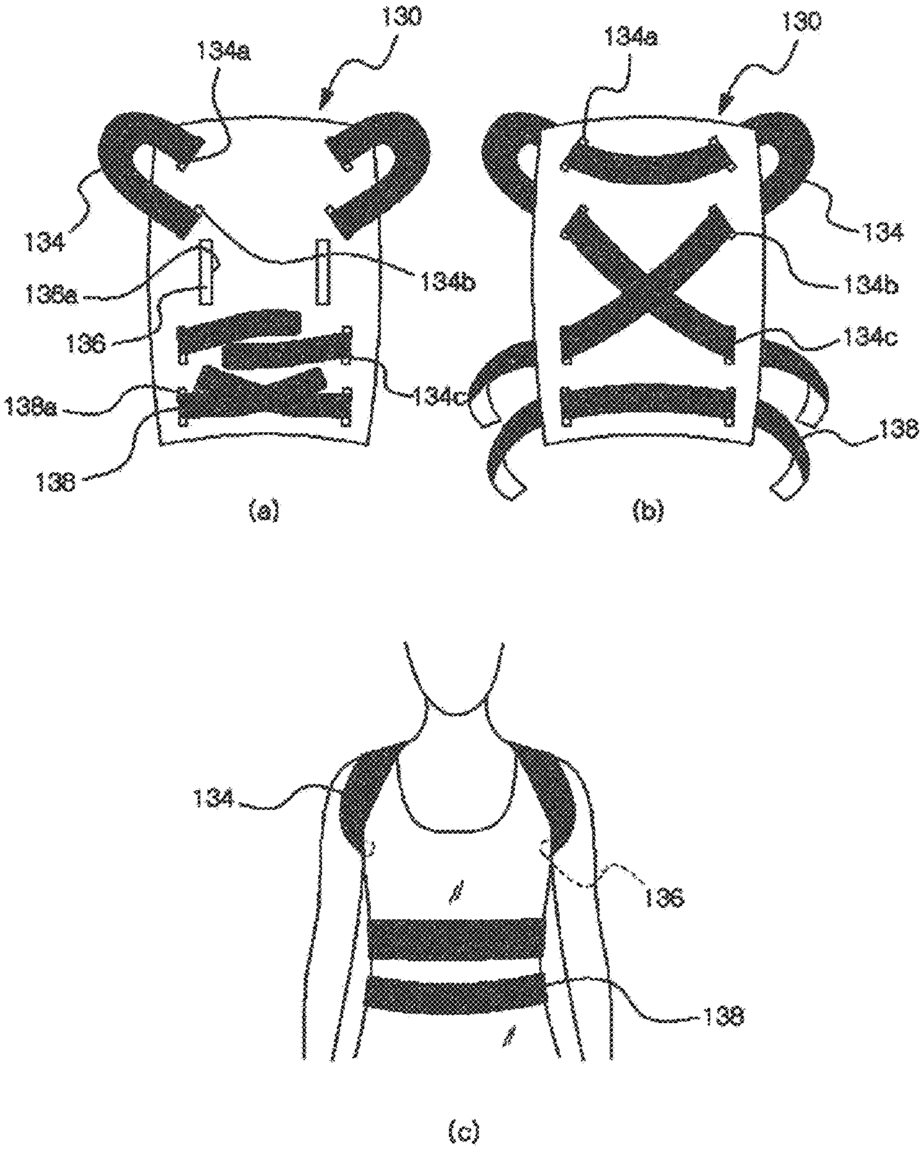
FIG. 4 is a front and rear view showing a state in which the backrest plate is equipped with a tightening band and a shoulder rack in the functional chair for posture correction and lumbar traction according to the present invention.

The above-described purposes, features and other advantages of the present invention will become more apparent by describing a preferred embodiment of the present invention in detail with reference to the attached drawings. Hereinafter, a functional chair for posture correction and lumbar traction according to an embodiment of the present invention will be described in detail with reference to the accompanying drawings.

Referring to FIGS. 1 to 10, a functional chair for posture correction and lumbar traction 100 according to an embodiment of the present invention includes a seat plate 110, a backrest plate support 120, a backrest plate 130, and a traction driving device 140.

As shown in FIGS. 1, 3, 8, and 9, a lower portion of the seat plate 110 is connected to legs 112, and the seat plate 110 is formed to have an area capable of sufficiently supporting the buttocks of a user when the user sits down on the seat plate 110. In this case, the legs 112 may have wheels respectively provided at lower portions of the legs 112 and configured to enable movement of the functional chair of the present invention.

In addition, the seat plate 110 has armrests 114 respectively located upright on opposite sides thereof and configured to allow the arms of the user to be placed on the respective armrests 114.

Moreover, one of the armrests 114 has a groove 1140 formed on the upper surface thereof, and an adjustment plate 1420 on which a driving part 142 of the traction driving device 140 is supported is detachably provided in the groove 1140.

On the other hand, the seat plate 110 has lower body bands 116 respectively provided at a front portion and a rear portion thereof and configured to support the buttocks and legs of the user. In this manner, the lower body bands 116 may have a function of fixing the lower body of the user to the seat plate 110 when lumbar traction is performed in a state in which the user lies down on the chair. At this time, the lower body bands 116 are made of the same material as that of an elastic and strong strap of a backpack. Here, each of the lower body bands 116 has Velcro tapes (hook-and-loop fasteners) respectively provided at opposite ends thereof and configured to connect the opposite ends to each other or to separate the opposite ends from each other.

The functional chair of the present invention performs a function of not only pulling the backrest plate 130 upwards so as to reduce the weight (body weight) of the user and pull the waist of the user upwards, but also moving the backrest plate 130 forwards and rearwards in a state in which a posture of the user is corrected (the body of the user is fixedly tightened by tightening bands or the like). When the backrest plate 130 is operated to move forwards and rearwards, the seat plate 110 is in a state of being fixed, which causes a decrease in an operating effect. In order to solve this problem, the functional chair of the present invention adds a function of moving the seat plate 110 in the same direction as the operation direction of the backrest plate 130, thereby making it possible to smoothly move the waist of the user in the forward-and-rearward direction.

Figure 10:
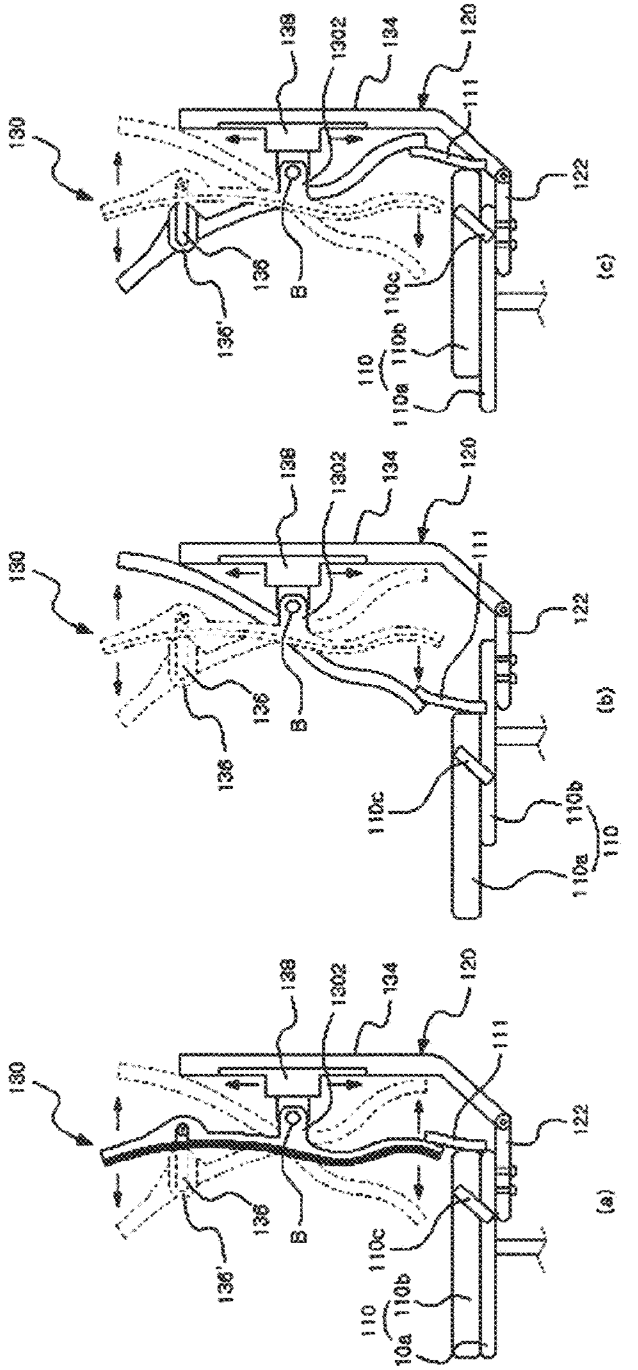
FIG. 10 is a side view showing a state in which a cushion seat plate among the seat plates is provided to be slidably movable, and a rear end of the cushion seat plate and a lower end of the backrest plate are connected to each other by a tension belt in the functional chair for posture correction and lumbar traction according to the present invention.

To this end, the seat plate 110 of another embodiment includes a fixed seat plate **110*a* and a cushion seat plate 110*b*** capable of being slidably moved on the upper side of the fixed seat plate 110*a*, as shown in FIG. 10.

That is, the seat plate 110 has rails (not shown in the drawing) respectively installed on the upper side and the lower side thereof in a state in which the fixed seat plate 110*a* and the cushion seat plate 110*b* are separated from each other. Specifically, one of the rails is installed on the lower side of the cushion seat plate 110*b*, and the other of the rails is installed on the upper side of the fixed seat plate 110*a*. That is, the respectively installed rails are disposed to face each other. In this manner, the cushion seat plate 110*b* is slidably moved in the movement direction of the backrest plate 130.

In addition, a tension belt 111 is provided at the rear end of the cushion seat plate 110*b* and the lower end of the backrest plate 130 adjacent to the cushion seat plate 110*b*. In this case, the tension belt 111 has a function of not only measuring tension when a user lies down on the chair and the waist (lumbar portion) of the user is pulled (refer to FIG. 9), but also smoothly moving the cushion seat plate 110*b* when the backrest plate 130 is moved in the forward-and-rearward direction.

Further, the cushion seat plate 110*b* has a seat plate fixing jack 110*c* provided on the side surface thereof and configured to perform a function of fixing, when the waist of the user is pulled, the cushion seat plate 110*b* to the fixed seat plate 110*a*. Meanwhile, the seat plate fixing jack 110*c* may be operated by an electric motor or the like.

As shown in FIG. 1, FIG. 3, FIG. 8, and FIG. 9, the backrest plate support 120 is rotatably provided at the rear end of the seat plate 110 so as to guide the movement direction of the backrest plate 130. In this manner, the backrest plate 130 located in the front of the backrest plate support 120 is rotatably moved and is movable upwards and downwards.

That is, the backrest plate support 120 serves as a support configured to support the weight of a user when the user is lifted upwards through the backrest plate 130. Further, the backrest plate support 120 has functions of connecting, through a connection tightening bolt B, a connection ring 1302 of the backrest plate 130 to a connection joint 148 so as to move the backrest plate 130 forwards and rearwards (for example, in the range of 20° to 25°), stably fixing the connection joint 148 to the backrest plate support 120 when the connection joint 148 moves upwards and downwards in a state in which the connection joint 148 is inserted into the backrest plate support 120, and fixing a driving shaft 144 in the upward-and-downward direction.

Furthermore, the backrest plate support 120 has a fixing part 122 fixed to a central portion of the rear end of the bottom surface thereof using a bolt or the like. Additionally, the backrest plate support 120 is provided to be rotatable in the forward-and-rearward direction relative to the horizontal axis at the end of the fixing part 122.

In addition, the backrest plate support 120 has bearings 1440 respectively configured to support opposite ends of the driving shaft 144 formed to have protrusions respectively protruding from the upper and lower ends thereof and configured to be rotatable within the protrusions. Further, the backrest plate support 120 has tightening bolt 124*a* and 124*b* in the horizontal direction thereof, in which the tightening bolt 124*a* and 124*b* are respectively disposed at locations not interfering with the bearings 1440.

In this case, the tightening bolts 124*a* and 124*b* may control the rotation angle of the backrest plate 130 that is rotatable in the forward-and-rearward direction. That is, when the tightening bolts 124*a* and 124*b* are moved rearwards, the rotation angle of the backrest plate 130 increases. Conversely, when the tightening bolts 124*a* and 124*b* are moved forwards, the rotation angle of the backrest plate 130 decreases.

Therefore, the tightening bolts 124*a* and 124*b* of the backrest plate support 120 are tightened so as to prevent forward-and-rearward movement of the backrest plate 130.

Conversely, the tightening bolts 124*a* and 124*b* of the backrest plate support 120 are loosened so as to allow the backrest plate 130 to be moved in the forward-and-rearward direction (for example, 20° to 25°). Normally, the tightening bolts 124*a* and 124*b* are used in a state of being loosened. When the upper body is raised or the waist is pulled, the tightening bolts 124*a* and 124*b* are used in a state of being tightened (fixed).

In addition, the backrest plate support 120 has a safety support 126 rotatably provided at the end of the fixing part 122. Here, the safety support 126 is unfolded from the fixing part 122 toward the floor around the horizontal axis thereof so as to support the backrest plate support 120. In this case, the upper side of the safety support 126 and an adjustment stick 126*a* are connected to each other. Furthermore, the adjustment stick 126*a* is pulled in a state in which the backrest plate support 120 is stretched 180 degrees so as to interfere with the lower end of the safety support 126, and then the upper end of the elastically supported safety support 126 is rotated at an upper portion of the rear surface of the backrest plate support 120 and is unfolded toward the floor, thereby performing a function of supporting the backrest plate support 120.

As shown in FIGS. 1 to 5 and FIGS. 7 to 9, the backrest plate 130 is provided in front of the backrest plate support 120 so as to be rotatable about a horizontal axis S. Further, the backrest plate 130 is formed to have a curved surface corresponding to a shoulder line and a spine line of the user and has the connection ring 1302 provided at a central portion of the rear side thereof. Here, the backrest plate 130 has a headrest 132 provided at the upper end thereof and includes a tightening band 134, shoulder racks 136, and a waist tightening band 138.

Meanwhile, the backrest plate 130 is manufactured using reinforced plastic and a mesh material in the shape of an ergonomic shoulder line and an S-line of the spine, and the S-line shape of the backrest plate 130 and the size thereof are classified by ergonomic body type.

The connection ring 1302 is formed to have a stepped structure and has a groove formed in a central portion of the stepped structure. Further, the connection ring 1302 has a hole formed to pass therethrough in the horizontal direction. In this manner, the hole of the connection ring 1302 and the backrest plate 130 are aligned concentrically with a horizontal hole formed in the connection joint 148 of the backrest plate support 120, thereby connecting the connection ring 1302 to the connection joint 148 using the connection tightening bolt B. As described above, a connection portion is formed by connecting the connection joint 148 to the connection ring 1302 through the connection tightening bolt B. Here, the connection portion may serve as a rotation shaft allowing the backrest plate 130 to be movable in the upward-and-downward direction and the forward-and-rearward direction (in the range of 20° to 25°).

The headrest 132 is rotatable upwards and downwards relative to one end of a connection rod provided at the rear surface of the headrest 132, and the other end of the connection rod is provided so as to be movable upwards and downwards from a central portion of the upper surface of the backrest plate 130. Further, the headrest 132 has through holes 1320 each having a slit structure, in which the through holes 1320 are respectively formed on opposite sides of the headrest 132. Here, a headband 1330 is provided so as to be detachable from the headrest 132 through the through holes 1320.

Furthermore, the chin and forehead of the user are brought into close contact with the headrest 132 by the headband 1330, thereby obtaining a functional effect of fixing and preventing turtle neck syndrome or straight neck syndrome of the user by properly maintaining a posture of the neck (cervical vertebra). Additionally, in the above-described state, since the head of the user is movable in the upward-and-downward direction and the leftward-and-rightward direction, the user may study or work without inconvenience.

The headband 1330 is made of a soft and elastic material and is finished with Velcro tape on opposite ends thereof, thereby making it possible to connect the opposite ends to each other or separate the same from each other. Additionally, the headband 1330 may be used by passing through (by being inserted into) the through hole 1320 of the headrest 132 only when necessary.

Furthermore, in the backrest plate 130, first, second, and third through holes 134*a*, 134*b*, and 134*c* of the slit structure are respectively located at the upper end, the middle end, and the lower end of the backrest plate 130 in a state of being spaced apart from each other, and fourth through holes 138*a* of the slit structure are located at the lower opposite ends of the backrest plate 130 in a state of being spaced apart from each other, thereby enabling the tightening band 134 and the waist tightening band 138 to be coupled to each other.

The tightening band 134 is provided to tighten both shoulders and the waist of the user using one band. In other words, the tightening band 134 sequentially passes through the first, second, and third through holes 134*a*, 134*b*, and 134*c* of the backrest plate 130 and then is bent toward a portion connecting the first and second through holes 134*a* and 134*b* to each other, thereby tightening the shoulders of the users.

Further, an upper portion of the waist of the user may be tightened by the opposite ends of the tightening band 134 that has passed through the third through hole 134*c*.

Figure 5:
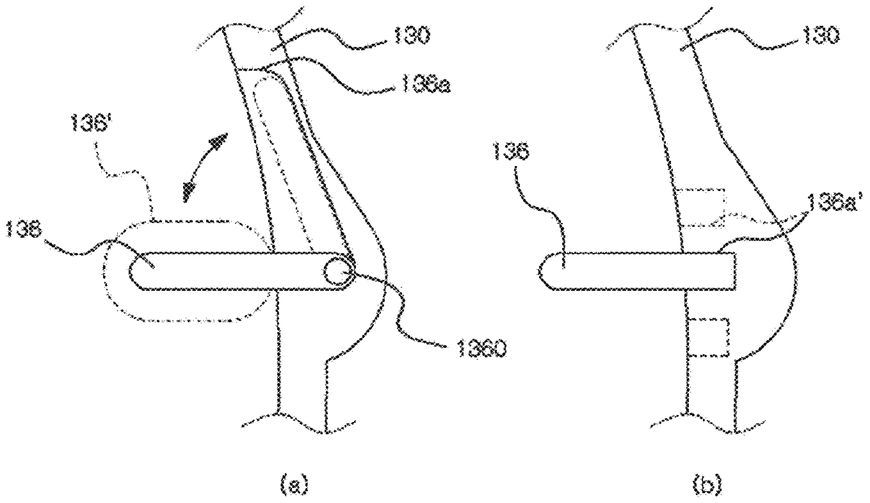
FIG. 5 is a side view showing a state in which the shoulder rack is rotated on the backrest plate in the functional chair for posture correction and lumbar traction according to the present invention.
Figure 6:
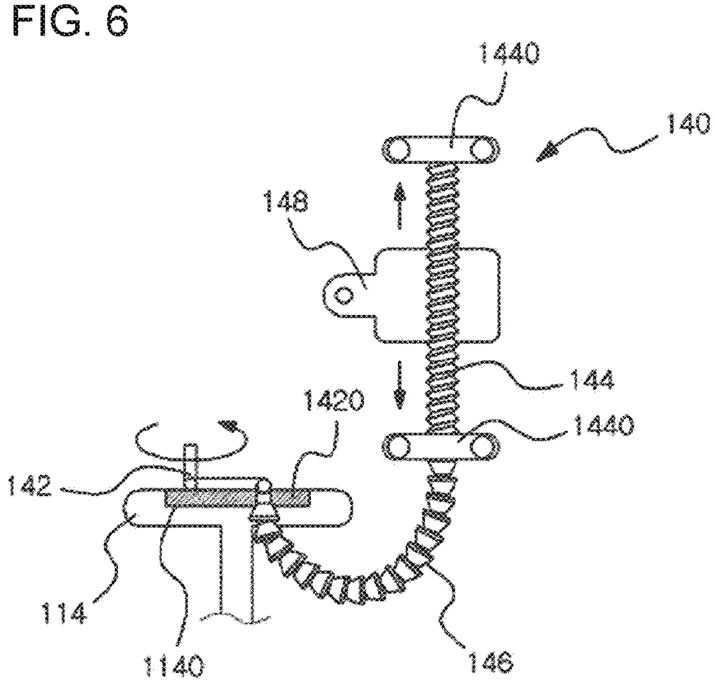
FIG. 6 is a side view showing a traction driving device in the functional chair for posture correction and lumbar traction according to the present invention.
Figure 7:
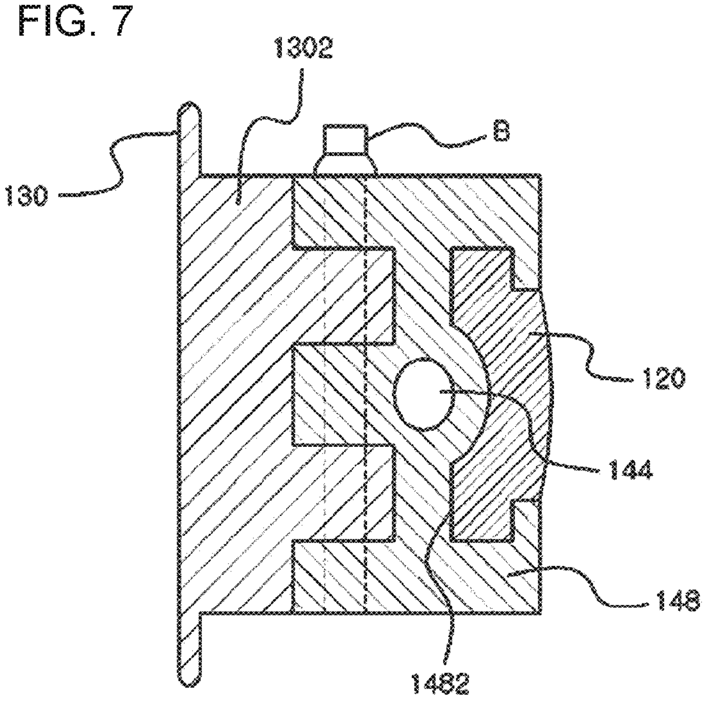
FIG. 7 is a cross-sectional view showing a coupling structure of a connection joint connecting the backrest plate support to the backrest plate in the traction driving device provided in the functional chair for posture correction and lumbar traction according to the present invention.
Figure 8:
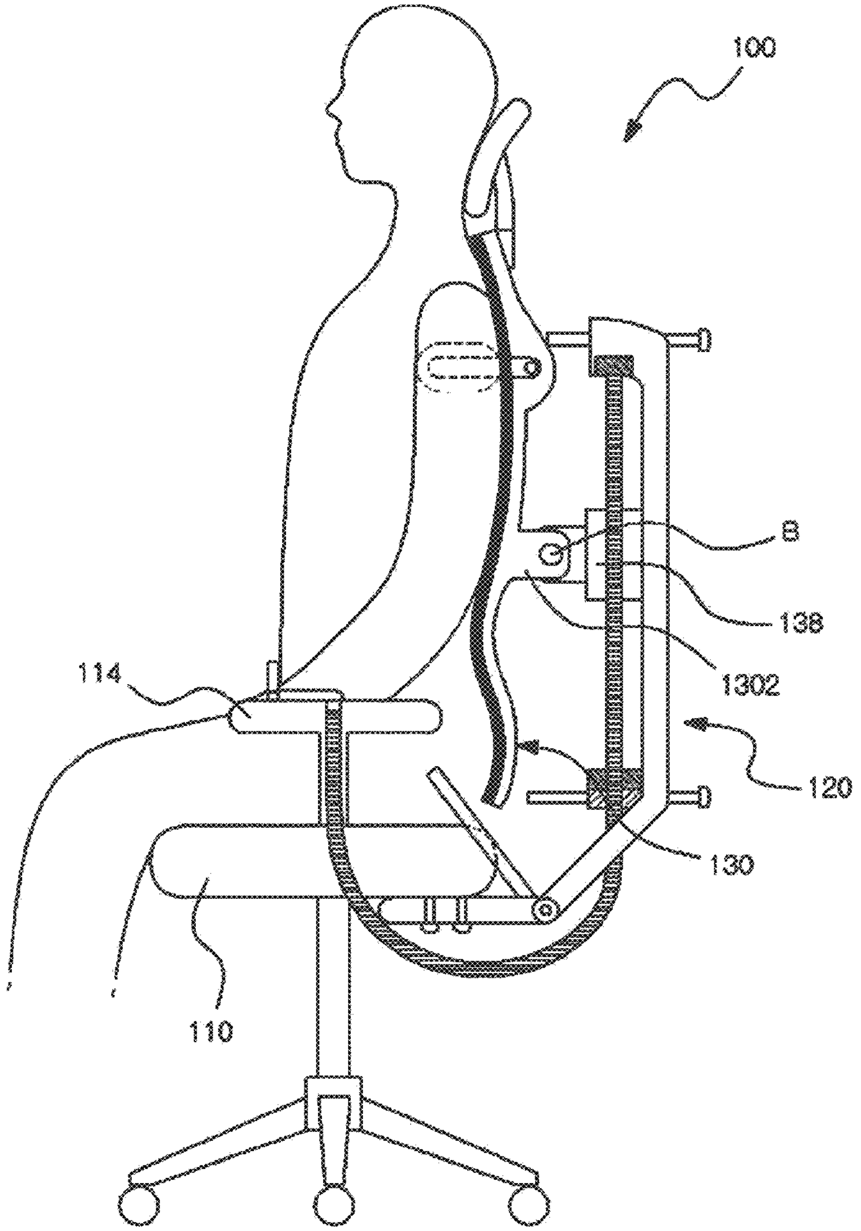
FIG. 8 is a side view showing an operating state in which the backrest plate is erected in the functional chair for posture correction and lumbar traction according to the present invention.
Figure 9:
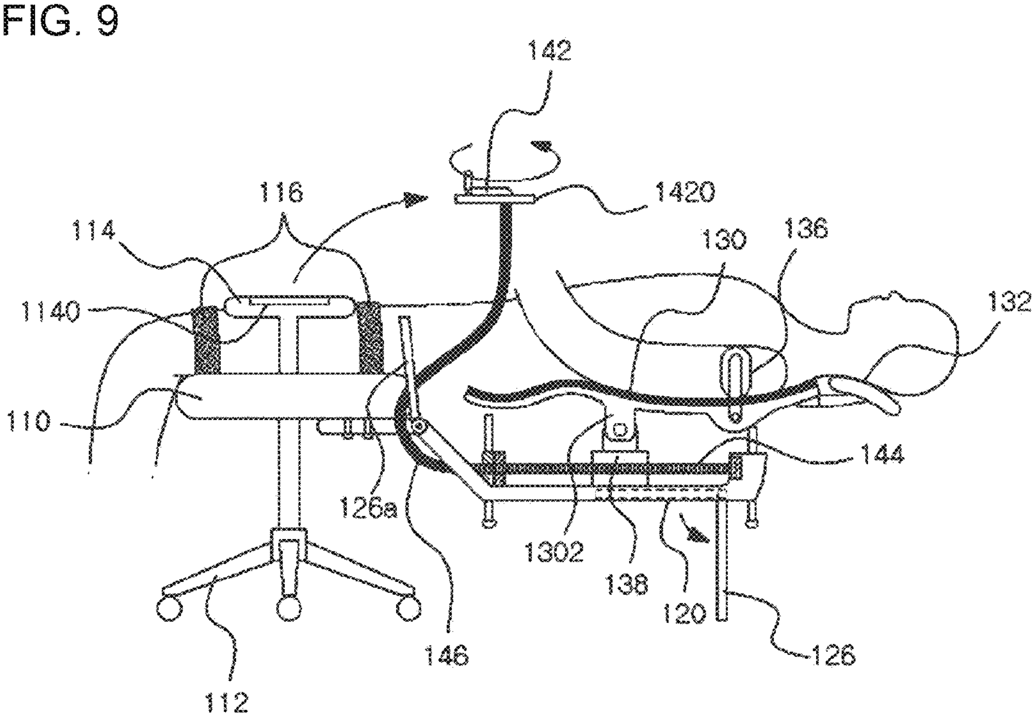
FIG. 9 is a side view showing an operating state in which the backrest plate is laid down in the functional chair for posture correction and lumbar traction according to the present invention.

As shown in FIG. 5(*a*), the shoulder racks 136 are respectively provided to be rotatable around lower axes 1360 respectively disposed in grooves 136*a* respectively formed in opposite sides of the backrest plate 130 and disposed between the second and third through holes 134*b* and 134*c*. Here, when unfolded, the shoulder racks 136 are respectively located in both armpits of the user.

Here, each of the shoulder racks 136 is formed to have a shape such as a circular rod. Each of the shoulder racks 136 is normally inserted into a corresponding one of the grooves 136*a*. When in use, each of the shoulder racks 136 is rotated 90 degrees and is withdrawn from the corresponding one of the grooves 136*a*. Further, when the upper body of the user is pulled upwards, each of the shoulder racks 136 provides additional traction force so as to support insufficient traction force from the tightening band 134 and the waist tightening band 138.

That is, each of the shoulder racks 136 divides the height of the user by ergonomic body type. For example, when the backrest plate 130 is moved upwards, the shoulder rack 136 supports the weight of the user with the upper body bands including the tightening band 134 and the waist tightening band 138, thereby serving as a central portion at which the upper body of the user is lifted upwards.

In addition, each of the shoulder racks 136 is provided with a protective band 136' formed of a material such as urethane and configured to be attached to or detached from a corresponding one of the shoulder racks 136 during use of the shoulder racks 136, thereby making it possible to protect the armpits from friction or pressure.

Moreover, as shown in FIG. 5(*b*), each of the shoulder racks 136 may be selectively used depending on the body shape by being bolt-tightened or inserted into any one of a plurality of holes 136*a'* formed in the backrest plate 130.

The waist tightening band 138 may tighten the waist of the user in a state in which the opposite ends of the waist tightening band 138 respectively pass through the fourth through holes 138*a*.

In addition, each of the tightening band 134 and the waist tightening band 138 is manufactured using a material such as an elastic and solid student bag strap and is finished with Velcro tapes (hook-and-loop fasteners) provided on the opposite ends thereof, thereby making it possible to connect the opposite ends to each other or separate the same from each other.

As shown in FIG. 1 and FIGS. 6 to 9, the traction driving device 140 is provided so that the backrest plate 130 is movable along the backrest plate support 120, thereby performing traction of the upper body of the user. Further, the traction driving device 140 includes the driving part 142, the driving shaft 144, a flexible shaft 146, and the connection joint 148.

The adjustment plate 1420 is detachably provided in the groove 1140 of the armrest 114 on one side of the seat plate 110 in a state in which the driving part 142 is fixed to the adjustment plate 1420. The driving part 142 provides driving force manually or automatically. In this case, the driving part 142 is exemplified as an adjustment stick configured to provide driving force by manual rotation thereof. When the driving part is configured to be automatically operated, a tension measurement sensor (not shown) capable of measuring a degree of traction of the user is attached to the driving part, and driving force may be generated by an electric motor or the like. That is, it is possible to perform traction of the lumbar spine of the user in a state in which the user lies down on the chair. Specifically, since the tension measurement sensor is attached to the driving part, it is possible to control tension step by step depending on the patient's condition (it is possible to control tension by attaching a tension belt and a measurement sensor to the functional chair of the present invention and additionally providing a medical aid device).

Here, the tension belt 111 and the measurement sensor (not shown in the drawing) are appropriately attached to the functional chair of the present invention, and the electric motor is driven, thereby having a function of adjusting and controlling traction force step by step in consideration of the weight and pain symptoms of the user. Further, the tension belt 111 is attached to the rear end of the seat plate 110 and the lower end of the backrest plate 130 so as to connect the rear end of the seat plate 110 and the lower end of the backrest plate 130 to each other, and the measurement sensor is configured to detect a degree of tension applied to the tension belt 111.

The driving shaft 144 is a spiral shaft rotatably supported on the upper portion and the lower portion of the rear surface of the backrest plate support 120, and the upper and lower ends of the driving shaft 144 are rotatably supported by the respective bearings 1440.

The flexible shaft 146 is configured to connect the adjustment plate 1420 having the driving part 142 connected thereto to a lower portion of the driving shaft 144, thereby transmitting driving force from the driving part 142 to the driving shaft 144 even if the adjustment plate 1420 is separated from the armrest 114.

In this manner, when the backrest plate 130 is unfolded 180 degrees so as to perform traction of the lumbar spine of the user, the adjustment plate 1420 connected to the flexible shaft 146 is detached from the armrest 114 and is moved to a desired location at which the flexible shaft 146 is operated by the driving part 142.

The connection joint 148 is provided with a nut structure spirally connected to the driving shaft 144 and is movable in one direction or the other direction in response to the rotation direction of the driving shaft 144, thereby moving the backrest plate 130 in the upward-and-downward direction or the forward-and-rearward direction.

In this case, the connection joint 148 is formed to have a stepped structure so as to be coupled to the connection ring 1302 of the backrest plate 130 disposed in front of the connection joint 148 in a coupling manner between a protruding portion and a recessed portion. Further, the connection joint 148 has a through hole, formed therein in the horizontal direction of the connection joint 148 and configured to allow the connection tightening bolt B to pass therethrough, and a groove 1482, formed in the rear side thereof and configured to allow the backrest plate support 120 to be coupled thereto. The groove 1482 has jaws respectively formed on opposite sides of the end portion thereof, in which the jaws are respectively coupled to step grooves respectively formed in opposite sides of the rear surface of the backrest plate support 120 in the height direction. In addition, the connection joint 148 has a spiral hole formed to pass through a central portion thereof in the longitudinal direction of the connection joint 148 and configured to allow the driving shaft 144 to be spirally coupled thereto.

Hereinafter, a description will be given as to an operation process of the functional chair for posture correction and lumbar traction 100 according to the embodiment of the present invention.

First, when the functional chair is used for neck and waist posture correction, a user sits on the seat plate 110.

Thereafter, the driving part 142 is rotated in the left and right directions so that an S-line of the backrest plate 130 and an S-line of the spine are aligned with each other (are in close contact with each other), and the height of each of the shoulder racks 136 is adjusted such that, when the user sits on the functional chair, each of the shoulder racks 136 is aligned with a corresponding one of the armpits of the user.

Next, the head of the user is brought into close contact with the headrest 132 by tightening (pulling) the headband 1330 (in this state, the head may be moved upwards, downwards, leftwards, and rightwards).

Then, the tightening band 134 corresponding to the shoulders of the user and the waist tightening band 138 corresponding to the waist of the user are tightened (pulled). In this manner, the back (spine) of the user is brought into close contact with the S-line of the backrest plate 130 (in this state, the user sitting on the functional chair may move the upper body forwards and rearwards (in the range of 20° to 25°), thereby allowing the user to study or work while maintaining a corrected posture).

Meanwhile, when the functional chair is used for neck and waist posture correction and waist traction, first, the user sits on the seat plate 110.

Thereafter, the driving part 142 is rotated in the left and right directions so that an S-line of the backrest plate 130 and an S-line of the spine are aligned with each other (are in close contact with each other), and the height of each of the shoulder racks 136 is adjusted such that, when the user sits on the functional chair, each of the shoulder racks 136 is aligned with a corresponding one of the armpits of the user.

Next, the head of the user is brought into close contact with the headrest 132 by tightening (pulling) the headband 1330 (in this state, the head may be moved upwards, downwards, leftwards, and rightwards).

Then, the tightening band 134 corresponding to the shoulders of the user and the waist tightening band 138 corresponding to the waist of the user are tightened (pulled). In this manner, the back (spine) of the user is brought into close contact with the S-line of the backrest plate 130 (in this state, the user sitting on the functional chair may move the upper body forwards and rearwards (in the range of 20° to 25°), thereby allowing the user to study or work while maintaining a corrected posture).

Next, the shoulder strap 136 is spread out at a right angle so as to be caught in the armpits of the user.

Thereafter, the adjustment stick, which is the driving part 142, is rotated in the left and right directions so as to move the backrest plate 130 upwards. At this time, the upper body of the user is also moved upwards, thereby having an effect of performing traction of the lumbar spine by weight (gravity). That is, when the adjustment stick is rotated, the flexible shaft 146 is rotated in conjunction with rotation of the adjustment stick and, as such, the driving shaft 144 is rotated in conjunction with rotation of the flexible shaft 146. In this manner, rotation of the driving shaft 144 moves the connection joint 148 upwards and downwards, thereby moving the backrest plate 130 upwards and downwards. Accordingly, the load of the upper body of the user may be halved by moving the upper body upwards and downwards.

Here, when traction of the lumbar spine of the user is performed in a state in which the upper body of the user lies down on the backrest plate 130, the lower body band 116 supporting the buttocks and legs is pulled and fixed to the seat plate 110.

Then, the adjustment plate 1420 having the adjustment stick fixed thereto is pulled so as to be separated from the groove 1140 in the armrest 114, and then the backrest plate support 120 is rotated 90 degrees in a state in which the user lies down on the backrest plate 130. Thereafter, the safety support 126 is unfolded downwards to touch the ground, and then the adjustment stick is rotated in the left and right directions to push the upper body of the user (the backrest plate 130) toward the head, thereby performing traction of the lumbar spine of the user.

Finally, when the functional chair is used as a general chair, first, the user sits on the seat plate 110, and the functional chair is appropriately set depending on the body shape of the user. Here, the driving part 142 is rotated in the left and right directions such that the S-line of the backrest plate 130 and the S-line of the spine are aligned with each other (are in close contact with each other), and the height of each of the shoulder racks 136 is adjusted such that, when the user sits on the functional chair, each of the shoulder racks 136 is aligned with a corresponding one of the armpits of the user.

As is apparent from the above description, the present invention provides a functional chair for posture correction and lumbar traction, the functional chair including a seat plate, a backrest plate configured to be rotatable relative to the seat plate, and bands respectively installed in the seat plate and the backrest plate and configured to support the lower body and the upper body of a user. The backrest plate is raised by a traction driving device so as to pull the upper body upwards in a state in which the lower body is fixed to the seat plate, thereby stretching the waist (performing traction of the lumbar spine). In this manner, it is possible to obtain effects of relieving compression of spinal nerve roots caused by reduction in disc size and disc protrusion, preventing an improper posture of the neck and back of the user, enabling the user to spend his or her daily life on the functional chair in a state of maintaining a corrected posture, preventing neck and back diseases caused by sitting on a chair for long hours, and preventing cervical disc, turtle neck syndrome, straight neck syndrome, scoliosis, stenosis, disc protrusion and relieving physical pain therefrom.

In addition, the chin and forehead of the user are brought into close contact with a headrest by a headband (the chin and forehead are pulled toward the headrest by the headband) so as to maintain the correct posture of the neck (cervical vertebra), thereby obtaining a functional effect of fixing and preventing turtle neck syndrome or straight neck syndrome of the user. Additionally, in the above-described state, since the head of the user is movable in the upward-and-downward direction and the leftward-and-rightward direction, the user may study or work while sitting on the chair without inconvenience.

Additionally, the seat is formed of a fixed seat plate and a cushion seat plate slidably movable on the upper side of the fixed seat plate. Here, the rear end of the cushion seat plate and the lower end of the backrest plate are connected to each other by a tension belt so as to perform a function of moving the cushion seat plate in the same direction as the movement direction of the backrest plate, thereby having an effect of smoothly moving the waist in the forward-and-rearward direction.

Although the embodiments of the present invention have been described above with reference to the accompanying drawings, those skilled in the art to which the present invention pertains will appreciate that various modifications, additions, and substitutions are possible, without departing from the scope and spirit of the invention as disclosed in the accompanying claims. Therefore, it should be understood that the embodiments described above are exemplary and not limited in all respects.

What is claimed is:

1. A functional chair for posture correction and lumbar traction, the functional chair comprising:

a seat plate having legs connected to a lower portion thereof, wherein the seat plate supports buttocks of a user when the user sits on the functional chair;

a backrest plate support rotatably provided at a rear end of the seat plate;

a backrest plate disposed in front of the backrest plate support and formed to have a curved surface, wherein the backrest plate is configured to be rotatable around a horizontal axis thereof, thereby enabling the user to maintain a state of sitting or lying down on the functional chair, and wherein the backrest plate has a headrest provided at an upper end thereof; and a traction driving device configured to enable the backrest plate to be moved in a movement direction of the backrest plate support, wherein the backrest plate is formed to have a concave shape or a convex shape on a side surface thereof, and wherein the backrest plate comprises:

a tightening band configured to primarily pass through upper opposite sides of the backrest plate so as to be supported on shoulders of the user in a bent state and to secondarily pass through lower opposite sides of the backrest plate in a crossed state, wherein opposite ends of the tightening band passing through the lower opposite sides are connected to each other so as to wrap a waist of the user;

shoulder racks disposed adjacent to the tightening band and respectively located on opposite sides of backrest plate, wherein the shoulder racks are respectively rotatably provided in grooves respectively formed in the opposite sides of the backrest plate, and wherein the shoulder racks are bolt-fastened to the backrest plate or are coupled to one of a plurality of holes formed in the backrest plate so as to be respectively located at both armpits of the user; and waist tightening bands provided on opposite lower sides of the shoulder racks, wherein the waist tightening bands are provided above and below each other.

2. The functional chair according to claim 1, wherein the headrest is rotatable upwards and downward and has a headband detachably provided on opposite sides thereof.

3. The functional chair according to claim 1, wherein the seat plate comprises a plurality of lower body bands configured to support the buttocks and legs of the user.

4. A functional chair for posture correction and lumbar traction, the functional chair comprising:

a seat plate having legs connected to a lower portion thereof, wherein the seat plate supports buttocks of a user when the user sits on the functional chair;

a backrest plate support rotatably provided at a rear end of the seat plate;

a backrest plate disposed in front of the backrest plate support and formed to have a curved surface, wherein the backrest plate is configured to be rotatable around a horizontal axis thereof, thereby enabling the user to maintain a state of sitting or lying down on the functional chair, and wherein the backrest plate has a headrest provided at an upper end thereof; and a traction driving device configured to enable the backrest plate to be moved in a movement direction of the backrest plate support, wherein the traction driving device comprises:

a driving part detachably provided on one of armrests respectively provided on opposite sides of the seat plate, wherein the driving part is manually operated leftwards and rightwards so as to move the backrest plate upwards and downwards or automatically provides driving force by an automatic motor and an operating switch;

a driving shaft rotatably supported by upper and lower portions of a back surface of the backrest plate support, wherein the driving shaft has a connection joint spirally coupled thereto and configured to move the backrest plate upwards and downwards according to a rotation direction of the driving shaft; and a flexible shaft configured to connect the driving part to the driving shaft.

5. A functional chair for posture correction and lumbar traction, the functional chair comprising:

a seat plate having legs connected to a lower portion thereof, wherein the seat plate supports buttocks of a user when the user sits on the functional chair;

a backrest plate support rotatably provided at a rear end of the seat plate;

a backrest plate disposed in front of the backrest plate support and formed to have a curved surface, wherein the backrest plate is configured to be rotatable around a horizontal axis thereof, thereby enabling the user to maintain a state of sitting or lying down on the functional chair, and wherein the backrest plate has a headrest provided at an upper end thereof; and a traction driving device configured to enable the backrest plate to be moved in a movement direction of the backrest plate support, wherein the backrest plate is rotated to perform, when the user lies down on the functional chair, the lumbar traction of the user by the traction driving device, the backrest plate support has a safety support unfolded from a rear surface thereof and supported on a ground, and a tension measurement sensor is attached between the seat plate and the backrest plate so as to gradually control tension therebetween.

6. A functional chair for posture correction and lumbar traction, the functional chair comprising:

a seat plate having legs connected to a lower portion thereof, wherein the seat plate supports buttocks of a user when the user sits on the functional chair;

a backrest plate support rotatably provided at a rear end of the seat plate;

a backrest plate disposed in front of the backrest plate support and formed to have a curved surface, wherein the backrest plate is configured to be rotatable around a horizontal axis thereof, thereby enabling the user to maintain a state of sitting or lying down on the functional chair, and wherein the backrest plate has a headrest provided at an upper end thereof; and a traction driving device configured to enable the backrest plate to be moved in a movement direction of the backrest plate support, wherein the seat plate comprises a fixed seat plate and a cushion seat plate slidably movable on an upper side of the fixed seat plate, and wherein a tension belt is connected to a rear end of the cushion seat plate and a lower end of the backrest plate adjacent to the cushion seat plate, thereby enabling the cushion seat plate to be moved in conjunction with movement of the backrest plate.

* * * * *